United States Patent [19]

Miura

[11] 4,149,495
[45] Apr. 17, 1979

[54] INTERNAL COMBUSTION ENGINE WITH AN AUXILIARY CHAMBER

[75] Inventor: Nobuhiro Miura, Susono, Japan

[73] Assignee: Toyota Jidosha Kogyo Kabushiki Kaisha, Toyota, Japan

[21] Appl. No.: 788,403

[22] Filed: Apr. 18, 1977

[30] Foreign Application Priority Data

Nov. 26, 1976 [JP] Japan .................... 51-157376

[51] Int. Cl.² .......................... F02B 19/10
[52] U.S. Cl. .................... 123/32 SP; 123/30 D; 123/32 L; 123/191 S
[58] Field of Search ........... 123/32 SP, 32 ST, 32 C, 123/32 K, 30 D, 32 D, 32 SJ, 191 S, 191 SP, 75 B, 32 L

[56] References Cited

U.S. PATENT DOCUMENTS

| | | | |
|---|---|---|---|
| 2,422,610 | 6/1947 | Bagnulo | 123/32 SP |
| 2,735,413 | 2/1956 | Meyer et al. | 123/32 SP |
| 3,102,521 | 9/1963 | Slemmons | 123/32 SP |
| 3,905,343 | 9/1975 | Ryan | 123/32 ST |
| 4,038,952 | 8/1977 | Nagano | 123/32 SP |
| 4,038,959 | 8/1977 | Takizawa et al. | 123/32 SP |
| 4,046,111 | 9/1977 | Nagano | 123/32 SP |

FOREIGN PATENT DOCUMENTS

| | | | |
|---|---|---|---|
| 751001 | 12/1943 | Fed. Rep. of Germany | 123/32 D |
| 874527 | 7/1949 | Fed. Rep. of Germany | 123/32 D |
| 322097 | 11/1929 | United Kingdom | 123/30 D |
| 645221 | 10/1950 | United Kingdom | 123/32 C |

Primary Examiner—Charles J. Myhre
Assistant Examiner—Andrew M. Dolinar
Attorney, Agent, or Firm—Stevens, Davis, Miller & Mosher

[57] ABSTRACT

Disclosed is an internal combustion engine with an auxiliary chamber which is connected to the main chamber via a connecting passage. The connecting passage is tangentially connected to the inner wall of the auxiliary chamber. A raised portion is formed on the inner wall of the auxiliary chamber at a position located opposite the inner wall of the auxiliary chamber, to which the connecting passage is tangentially connected. A recess is formed in the auxiliary chamber beneath the raised portion. The nozzle of the fuel injection valve is directed toward the recess for forming a rich air-fuel mixture therein. The spark gap of the spark plug is located in the recess for igniting the rich air-fuel mixture therein.

7 Claims, 4 Drawing Figures

INTERNAL COMBUSTION ENGINE WITH AN AUXILIARY CHAMBER

DESCRIPTION OF THE INVENTION

The present invention relates to an internal combustion engine with an auxiliary chamber.

There has been known an internal combustion engine in which a combustion chamber comprises a main chamber, with an intake valve for leading air into the main chamber, and an auxiliary chamber. In this engine, a connecting passage communicating the main chamber with the auxiliary chamber opens into the auxiliary chamber tangentially to the inner wall of the auxiliary chamber, and the nozzle of a fuel injection valve and the spark gap of a spark plug are disposed in the auxiliary chamber. A ring shaped raised portion defining a circular restricted opening in the auxiliary chamber is formed along the inner wall of the auxiliary chamber, and the inside of the auxiliary chamber is divided by the raised portion into an upper chamber and a lower chamber into which the connecting passage opens. A recess is formed by the raised portion in the lower chamber and the spark gap of the spark plug is located in the recess. The nozzle of the fuel injection valve is located in the upper chamber and is arranged so as to be directed to the recess. The fuel injected from the fuel injection valve is ignited by the spark plug and, as a result, combustion gas is injected into the main chamber from the auxiliary chamber via the connecting passage.

In this engine, a relatively rich air-fuel mixture is formed in the recess in which the spark gap of the spark plug is located and a relatively lean air-fuel mixture is formed in the upper chamber. At first, the relatively rich air-fuel mixture in the recess is ignited to burn the mixture in the lower chamber and, then, flame propagates into the upper chamber via the ring shaped restricted opening. At this time, since the flame stream passing through the restricted opening is throttled by the restricted opening, the flame disturbs the lean air-fuel mixture in the upper chamber. This results in the flame slowly propagating in the upper chamber. Consequently, in this case, the mixture in the auxiliary combustion chamber causes combustion similar to the combustion at a constant pressure which causes a small fluctuation of pressure.

Recently, in order to reduce the amount of harmful components in the exhaust gas, there has been proposed a method of using a super lean air-fuel mixture having an air-fuel ratio of more than 20:1 or a mixture containing a large amount of recirculated exhaust gas therein. However, the flame speed of a super lean air-fuel mixture is very slow and, thus, the speed of combustion is extremely slow. In addition, when the mixture containing a large amount of recirculated exhaust gas is used, it is necessary to fully mix the recirculated exhaust gas with an air-fuel mixture for obtaining a good combustion. Nevertheless, even if the recirculated exhaust gas is fully mixed with the air-fuel mixture, the speed of combustion is very slow. As is known to those skilled in the art, a slow combustion speed brings about an unstable combustion.

Consequently, in order to obtain a stable combustion by using a super lean air-fuel mixture or a mixture containing a large amount of recirculated exhaust gas therein, it is necessary to quicken the speed of combustion. However, in a conventional internal combustion engine, since the circular restricted opening serves to control the combustion so as to slow the speed of combustion, it is difficult to quicken the speed of the combustion of a super lean air-fuel mixture or of a mixture containing a large amount of recirculated exhaust gas therein and to obtain a stable combustion.

An object of the present invention is to provide an internal combustion engine with an auxiliary chamber capable of quickening the speed of flame, and of obtaining stable combustion of a super lean air-fuel mixture and of a mixture containing a large amount of recirculated exhaust gas therein.

According to the present invention, there is provided an internal combustion engine comprising:

a cylinder block having a cylinder bore therein, a cylinder head having a cavity therein and mounted on said cylinder block, said cavity having an inner wall which defines an auxiliary chamber with an axis;

a piston reciprocally movable in said cylinder bore, said piston and said cylinder head forming a main chamber therebetween, an intake valve movably mounted on said cylinder head for leading gas into said main chamber;

An exhaust valve movably mounted on said cylinder head for discharging exhaust gas into the atmosphere;

a connecting passage formed in said cylinder head and communicating said main chamber with said auxiliary chamber, said connecting passage being arranged to be tangentially connected to the inner wall of said auxiliary chamber;

a raised portion formed on the inner wall of said auxiliary chamber at a position located opposite the inner wall to which said connecting passage is tangentially connected with respect to the axis of said auxiliary chamber, said raised portion dividing said auxiliary chamber into an upper section and a lower section into which said connecting passage opens and forming a recess in said lower section beneath said raised portion;

a fuel injection valve having an injecting nozzle disposed in said auxiliary chamber and directed to said recess for forming a rich air-fuel mixture therein, and;

a spark plug having a spark gap located in said recess for igniting the rich air-fuel mixture therein.

The present invention may be more fully understood from the description set forth below of preferred embodiments of the invention, together with the accompanying drawings.

DESCRIPTION OF PREFERRED EMBODIMENTS

Figure 1:
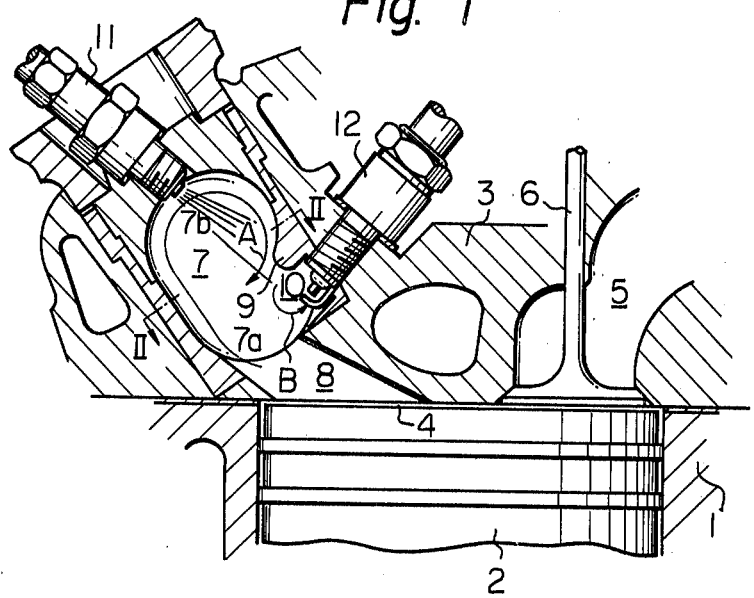
FIG. 1 is a cross-sectional side view of an embodiment of an internal combustion engine according to the present invention.

Referring to FIG. 1, an internal combustion engine with an auxiliary chamber according to the present invention comprises:

a cylinder block 1;

a piston 2 reciprocally movable in the cylinder block 1;

a cylinder head 3 fixed onto the cylinder block 1;

a main chamber 4 formed between the piston 2 and the cylinder head 3, which chamber 4 has an extremely small volume so that when the piston 2 reaches the top dead center, it will not contact an intake valve 6 and an exhaust valve (not shown);

an intake port 5 for leading introduced gas, consisting of air or of air containing a large amount of recirculated exhaust gas therein, into the main chamber 4;

an auxiliary chamber 7 formed in the cylinder head 3, and;

a connecting passage 8 communicating the auxiliary chamber 7 with the main chamber 4.

Figure 2:
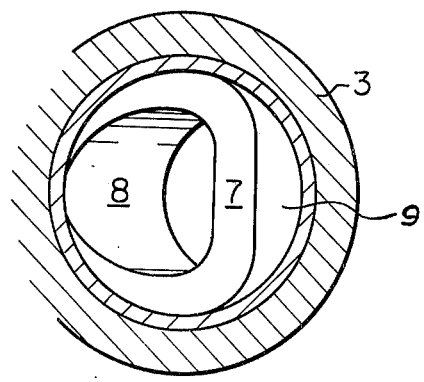
FIG. 2 is a cross-sectional view taken along the line II—II in FIG. 1.

The auxiliary chamber 7 has an elongated circular shape or an elliptical shape in a longitudinal cross-section as shown in FIG. 1, and has a circular shape in a transverse cross-section as shown in FIG. 2. The connecting passage 8 opens into the auxiliary chamber 7 so as to be tangentially connected to the inner wall of the auxiliary chamber 7. On the other hand, a raised portion 9 is formed on the inner wall of the auxiliary chamber 7 at a position located opposite the inner wall to which the connecting passage 8 is tangentially connected. The inside of the auxiliary chamber 7 is divided by the raised portion 9 into a lower chamber 7a and an upper chamber 7b. In addition, a recess 10 is formed in the lower chamber 7a by the raised portion 9. The nozzle of a fuel injection valve 11 is located in the upper chamber 7b and is arranged so as to be directed toward the recess 10. The spark gap of a spark plug 12 is located in the recess 10.

In operation, at the time of the intake stroke, air or air containing a large amount of recirculated exhaust gas therein is introduced into the main chamber 4 via the intake valve 6. Then, at the time of the compression stroke, the introduced air is forced into the auxiliary chamber 7 via the connecting passage 8. Since, as shown in FIG. 1, the connecting passage 8 is smoothly connected to the inner wall of the auxiliary chamber 7, and no raised portion is formed on the inner wall side of the auxiliary chamber 7 to which the connecting passage 8 tangentially connected, the air forced into the auxiliary chamber 7 from the connecting passage 8 moves forward along the inner wall of the auxiliary chamber 7 and, then, the flow direction of the air is deflected by the raised portion 9. As a result of this, a strong primary swirl motion shown by the arrow A is caused in the upper chamber 7b. In addition, this primary swirl motion causes a secondary swirl motion shown by the arrow B in the recess 10.

The fuel injecting operation of the fuel injection nozzle 11 is effected at the beginning of the compression stroke. At this time, a strong swirl motion as shown by the arrow A is not caused in the upper chamber 7b. Consequently, the fuel injected from the fuel injection valve 11 is collected at the region near the recess 10. When the piston 2 moves upwards, a strong primary swirl motion A and a secondary swirl motion B are caused as mentioned above. As a result of this, a part of the fuel collected at the region near the recess 10 is transported into the upper chamber 7b by the primary swirl motion A and, thus, a relatively lean air-fuel mixture or a super lean air-fuel mixture is formed in the upper chamber 7b. On the other hand, the remaining fuel is vaporized in the recess 10 and, as a result, a relatively rich air-fuel mixture is formed in the recess 10. Then, the relatively rich air-fuel mixture in the recess 10 is ignited by the spark plug 12. The flame core thus formed rapidly grows due to the presence of the secondary swirl motion B, and then, the flame thus grown swirls in the upper chamber 7b together with the strong primary swirl motion A and rapidly propagates into the entire space of the upper chamber 7b. By forming the strong primary swirl motion and the secondary swirl motion in the auxiliary chamber 7 as mentioned above, the speed of combustion can be increased and, thus, a stable combustion can be obtained.

Figure 3:
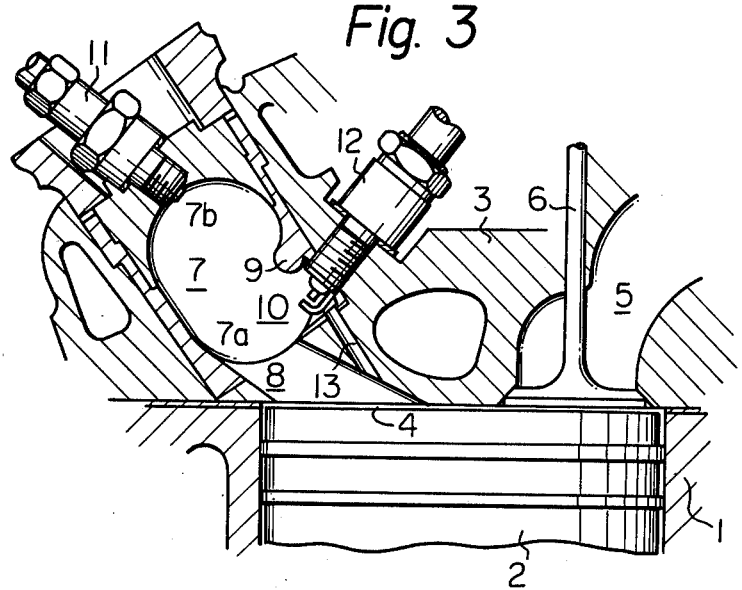
FIG. 3 is a cross-sectional side view of another embodiment according to the present invention.
Figure 4:
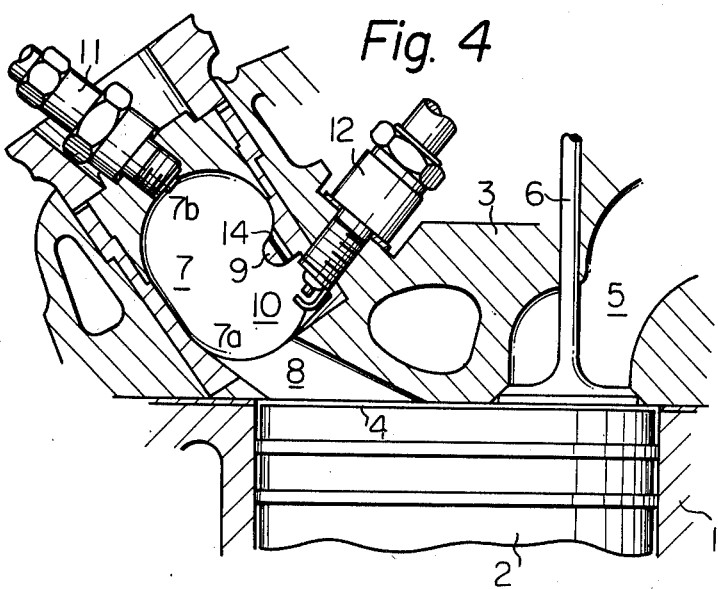
FIG. 4 is a cross-sectional side view of a further embodiment according to the present invention.

In addition, the provision of the raised portion 9 causes the residual exhaust gas to stagnate in the recess 10, thereby causing a danger that a misfire will occur. In order to avoid this danger, as is shown in FIG. 3, a passage 13 communicating the connecting passage 8 with the recess 10 may be formed in the cylinder head 3, so that the air injected from the passage 13 into the recess 10 scavenges the residual exhaust gas in the recess 10 at the time of the compression stroke. On the other hand, as is shown in FIG. 4, a passage 14 communicating the recess 10 with the upper chamber 7b may be formed in the raised portion 9, so that a part of the mixture generating the strong primary swirl motion A in the upper chamber 7b is introduced into the recess 10, thereby scavenging the residual exhaust gas in the recess 10.

In addition, a lean air-fuel mixture can be used as the gas introduced into the main combustion chamber 4 via the intake valve 6.

Furthermore, it is preferable that the spark gap of the spark plug 12 be located in the vicinity of the connecting passage 8. Such a location of the spark plug 12 causes the combustion gas to spread into the lower chamber 7a so as to cover the opening of the connecting passage 8. Then, this combustion gas successively burns the unburned gas located at the periphery of the auxiliary chamber 7 and, then, the flame of the combustion gas propagates towards the unburned gas located at the center of the auxiliary chamber 7. As a result, the combustion gas is injected into the main chamber 4 via the connecting passage 8 as the pressure in the auxiliary chamber 7 is elevated. Thus, there is no danger that unburned gas is injected into the main chamber 4.

According to the present invention, a stable and a rapid growth of the flame corn can be caused by the secondary swirl motion and the speed of combustion is quickened by the strong primary swirl motion. As a result of this, even if a super lean air-fuel mixture or a mixture containing a large amount of recirculated exhaust gas is used, a stable combustion can be obtained, thereby greatly reducing the amount of harmful components in the exhaust gas.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head mounted on said cylinder block, means defining an auxiliary combustion chamber having an inner wall in said cylinder head;
   a piston reciprocally movable in said cylinder bore, said piston and said cylinder head defining a main combustion chamber therebetween below said auxiliary combustion chamber;
   an intake valve movably mounted on said cylinder head and through which a combustible fuel mixture is introduced into said main combustion chamber;

means defining a connecting passage in said cylinder head for fluidly communicating said main combustion chamber with said auxiliary combustion chamber, said passage being tangentially disposed relative to the inner wall of said auxiliary combustion chamber and opening into the lower end of said auxiliary combustion chamber on one side thereof;

means defining a projection extending transversely inwardly from said inner wall in a region thereof spaced from the bottom and opposite said one side thereof, said projection extending continuously around substantially half the periphery of said inner wall and dividing said auxiliary combustion chamber into an upper section and a lower section into which the connecting passage opens and defining a recess in said lower section immediately beneath said projection between it and the lower end of said auxiliary combustion chamber and adjacent the connecting passage;

a fuel injection valve having a nozzle in said auxiliary combustion chamber directed directly toward said recess for injecting a rich air-fuel mixture directly thereinto; and a spark plug having a spark gap in said recess and adjacent said connecting passage for igniting the rich air-fuel mixture therein.

2. An internal combustion engine as claimed in claim 1, wherein said main chamber has an extremely small volume so that when the piston reaches the top dead center it nearly but does not contact said intake valve.

3. An internal combustion engine as claimed in claim 1, wherein said recess is connected to said connecting passage via a passage for scavenging said recess.

4. An internal combustion engine as claimed in claim 1, wherein said recess is connected to said upper section via a passage passing through said projection for scavenging said recess.

5. An internal combustion engine as claimed in claim 1, wherein said auxiliary chamber has a symmetrical shape around an axis of said auxiliary chamber.

6. An internal combustion engine as claimed in claim 5, wherein said auxiliary chamber has an elongated circular shape in a longitudinal cross-section.

7. An internal combustion engine comprising:

a cylinder block having a cylinder bore therein;

a cylinder head mounted on said cylinder block, means defining an auxiliary combustion chamber having an inner wall in said cylinder head;

a piston reciprocally movable in said cylinder bore, said piston and said cylinder head defining a main combustion chamber therebetween below said auxiliary combustion chamber;

an intake valve movably mounted on said cylinder head and through which a combustible fuel mixture is introduced into said main combustion chamber;

means defining a connecting passage in said cylinder head for fluidly communicating said main combustion chamber with said auxiliary combustion chamber, said passage being tangentially disposed relative to the inner wall of said auxiliary combustion chamber and opening into the lower end of said auxiliary combustion chamber on one side thereof;

means defining a projection extending transversely inwardly from said inner wall in a region thereof spaced from the bottom and opposite said one side thereof, said projection extending continuously around substantially half the periphery of said inner wall and dividing said auxiliary combustion chamber into an upper section and a lower section into which the connecting passage opens and defining a recess in said lower section immediately beneath said projection between it and the lower end of said auxiliary combustion chamber and adjacent the connecting passage;

a fuel injection valve having a nozzle in the upper end of said auxiliary combustion chamber directed downwardly directly toward said recess for injecting a rich air-fuel mixture directly thereinto; and a spark plug having a spark gap on the lower end thereof, said spark gap being in said recess and adjacent said connecting passage with the lower end of the spark plug extending between the projection and the lower end of the auxiliary combustion chamber.

* * * * *